United States Patent [19]
Ostwald

[11] 3,915,515
[45] Oct. 28, 1975

[54] PRESSURE-MEDIUM LUBRICATED SLIDING BEARING

[75] Inventor: Fritz Ostwald, Buchschlag, Germany

[73] Assignee: ITT Industries, Inc., New York, N.Y.

[22] Filed: May 2, 1974

[21] Appl. No.: 466,139

[30] Foreign Application Priority Data
May 19, 1973 Germany.......................... 2325525

[52] U.S. Cl................................ 308/9; 308/DIG. 1
[51] Int. Cl.².......................................... F16C 1/24
[58] Field of Search............. 308/9, 36.3, 106, 107, 308/122, DIG. 1, 170

[56] References Cited
UNITED STATES PATENTS

| | | |
|---|---|---|
| 3,004,180 | 10/1961 | Macks................................. 308/9 X |
| 3,503,658 | 3/1970 | Remmers.............................. 308/9 |
| 3,517,973 | 6/1970 | Hirs..................................... 308/9 |
| 3,685,875 | 8/1972 | Dee....................................... 308/9 |
| 3,764,186 | 10/1973 | Laing et al........................... 308/9 |

Primary Examiner—M. Henson Wood, Jr.
Assistant Examiner—Gene A. Church
Attorney, Agent, or Firm—J. B. Raden; D. P. Warner

[57] ABSTRACT

A lubricated sliding bearing is disclosed for use in a system employing a pressure medium to provide lubrication. The sliding bearing is held in a mid-position between two opposite guide surfaces.

16 Claims, 3 Drawing Figures

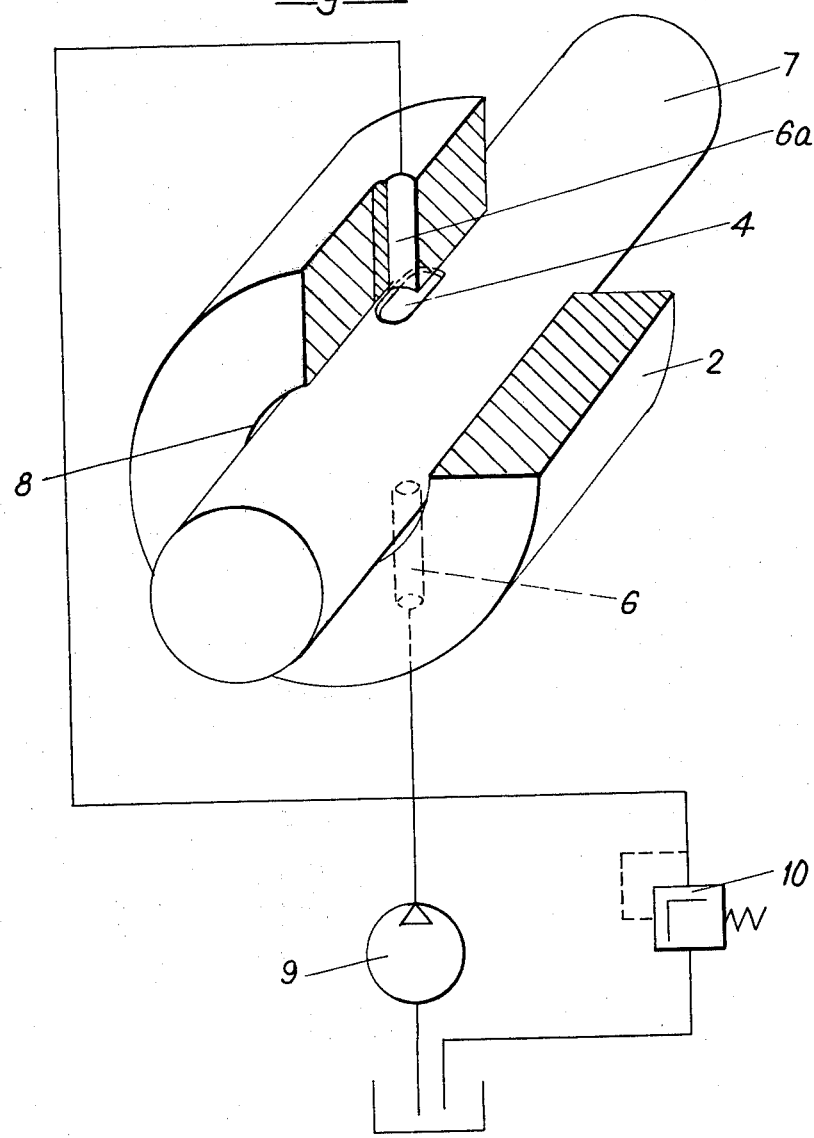

PRESSURE-MEDIUM LUBRICATED SLIDING BEARING

BACKGROUND OF THE INVENTION

Field of the Invention

This invention relates to a pressure-medium lubricated sliding bearing for the arrangement of rotary component parts between at least two opposed guide surfaces.

In this arrangement, good lubrication of the guide surfaces is required in order to prevent friction between the rotary component parts and the bearing housing.

SUMMARY OF THE INVENTION

It is an object of this invention to provide a sliding bearing of the above mentioned kind, wherein the rotary component part is kept in a mid-position between the facing guide surfaces.

According to this invention the foregoing and ancillary objects are attained by the use of one or more pressure pockets which are arranged in the guide surfaces of the rotary component part or of the bearing housing, and are alternately pressured by the application of a pressure medium.

According to one embodiment of such a pressure medium lubricated sliding bearing, pressure pockets, which are diametrically opposite in pairs, are arranged, evenly spaced, on a graduated circle at the guide surfaces of the rotary component part, and pressure-medium holes are arranged in diametrically opposite evenly spaced pairs on a corresponding graduated circle of the bearing housing. In the practice of this method, the effective pressure surface of the pressure pockets is made larger than the effective pressure surface of the pressure-medium holes.

There are two possibilities for arranging the pressurepockets and the pressure-medium holes. The first possibility is to arrange the pressure pockets of one guide surface of the rotary component part congruently opposite to those of the other guide surface of the rotary component part, and to stagger the pressure-medium holes of one guide surface of the bearing housing opposite to those of the other guide surface of the bearing housing. The other possibility is to arrange the pressure-medium holes of one guide surface of the bearing housing congruently opposite to those of the other guide surface of the bearing housing, and to stagger the pressure pockets of one guide surface of the rotary component part opposite to those of the other guide surface of the rotary component part. It is advantageous to stagger the pressure-medium holes resp. the pressure pockets of one guide surface relative to those of the other guide surface of the bearing housing resp. of the rotary component part on the graduated circle by half the distance between two pressure-medium holes resp. pressure pockets.

Another embodiment is to dispose the pressure-medium holes radially facing each other in the guide surfaces defined by a cylindrical wall of a bearing hole, and to dispose one or several pressure pockets, which are not facing each other, in the lateral area of a cylindrical component part rotatably disposed in this bearing hole.

If a bearing is constantly loaded unilaterally, it is possible to design the pressure pockets at the bearing points, which are applied by a higher load, with a larger effective pressure surface relative to this higher load. Thus compensation is assumed.

Advantages of the invention include the fact that with low rotational speed there is a constant wedge-shaped high-pressure lubrication film between the guide surfaces of the rotary component part and the guide surfaces of the bearing housing which largely minimize the danger of seizing between these two component parts. Owing to this fact less high-grade bearing material is needed, and thus such bearings become less expensive. Another advantage is that owing to the constant pressure-medium interchange no essential heating develops.

BRIEF DESCRIPTION OF THE DRAWINGS

An embodiment of this invention is shown in the drawings, in which

FIG. 3 is a perspective view in partial section of a sliding bearing of a shaft.

DESCRIPTION OF PREFERRED EMBODIMENTS

Figure 1:
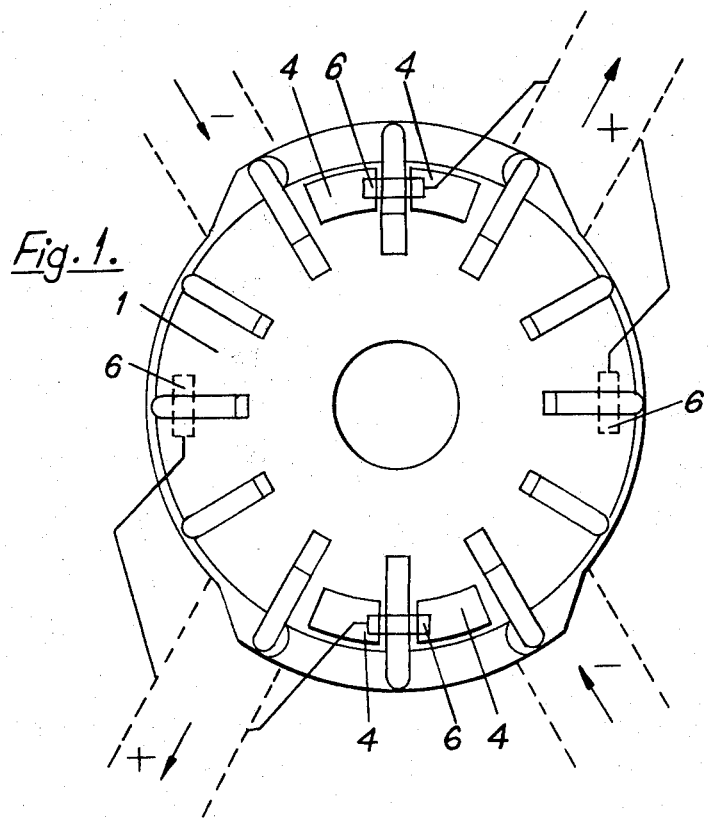
FIG. 1 is a sectional side-view of a vane-type rotary pump.
Figure 2:
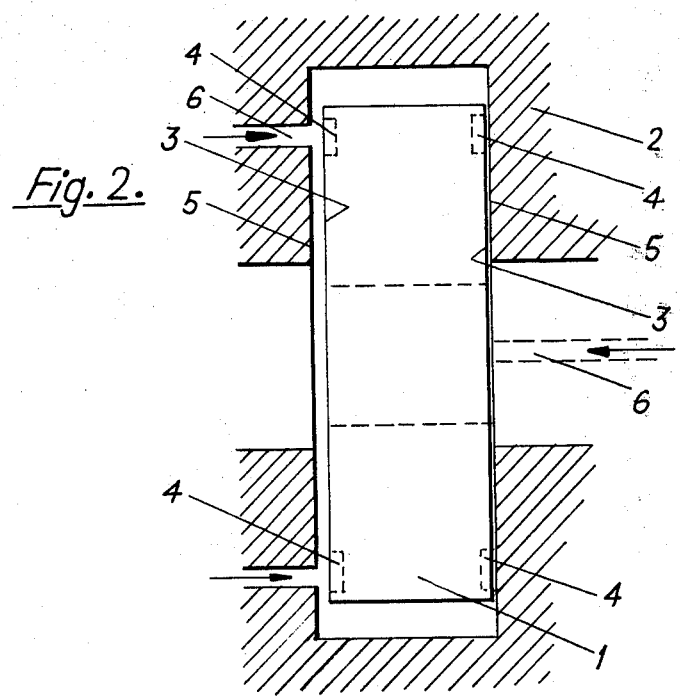
FIG. 2 is a cross-sectional view of the device according to FIG. 1.

The rotor 1 of a vane-type rotary pump is shown in FIG. 1 and in FIG. 2, as it would be arranged in a bearing housing 2. The rotor is designed with one facing pair of pressure pockets 4 on each of the guide surfaces 3. On every guide surface 5 of the bearing housing 2 a pair of diametrically facing pressure-medium holes 6 is disposed in such a way that the pair of pressure-medium holes on one guide surface is staggered by 90° in relation to the pair of pressure-medium holes of the opposite guide surface.

When the device is in operation, and the rotary part 1 is rotating, the pressure pockets 4 e.g. overlap the pressure-medium holes 6, as shown in FIG. 2 on the left-hand side. Owing to the arrangement of the pressure pockets 4, the surface supplied by pressure when the rotor is in the illustrated position is larger on the left-hand side than on the right-hand side, where there is only a surface supplied by pressure to the extent of the pressure-medium hole 6, and the rotary component part 1 is shifted to the right. After a further rotation of 90° the pressure pockets 4 overlap the pressure-medium holes 6 on the right-hand side, and now the above described process is reversed, and the rotary component part 1 is shifted to the left. When the device is in operation and the rotary component part 1 is continuously rotating, it is shifted alternately to the right and to the left. When the frequency of the back-and-forth movements increases with higher rotational speed, the rotary part 1 reaches equilibrium in a mid-position on account of its mass moment of inertia.

If a better stabilization of the rotary part 1 is to be reached in the mid-position, it is only necessary to increase either the number of the pressure pockets or the number of the pressure-medium connectors. By this process the frequency of the back-and-forth movements is increased, too, and even with low rotational speed a relatively stable mid-position of the rotary part 1 in the bearing housing 2 is achieved.

FIG. 3 shows the sliding bearing of a shaft wherein the shaft 7 is designed with a pressure pocket 4, and the bearing housing 2 is designed with two diametrically facing pressure-medium holes 6 and 6a, by which the shaft 7 is applied by pressure medium transported by the pump 9. In order to regulate the pump pressure, a valve 10 is connected in the pressure line. When the shaft 7 is rotating, the pressure pocket 4 is supplied by pressure alternately via pressure-medium hole 6 and pressure-medium hole 6a. Owing to the larger actuating surface defined by the pressure pocket 4, the shaft is shifted alternately to the upper and to the lower wall surface of the bearing hole 8. With higher rotational speed of the shaft 7 or with a greater number of pressure pockets 4, a higher frequency of the back-and-forth movements is reached, and on account of the mass moment of inertia, the shaft 7 can reach equilibrium in a mid-position in the bearing hole 8.

While the principles of the invention have been described above in connection with specific apparatus and applications, it is to be understood that this description is made only by way of example and not as a limitation on the scope of the invention.

What is claimed is:

1. A sliding bearing, lubricated by a pressure-medium, to provide support for rotary component parts between at least two opposed guide surfaces, comprising a bearing housing supporting a rotary component part, at least one pressure pocket arranged in each guide surface of the rotary component part, and pressure-medium holes in guide surfaces of the bearing housing through which the pressure pocket is supplied with a pressure medium to enable support of the rotary component part, said pressure pockets being arranged in evenly spaced diametrically opposite pairs, on a graduated circle on guide surfaces of the rotary component part and said pressure-medium holes being arranged in evenly spaced diametrically opposite pairs on a corresponding granduated circle of the bearing housing.

2. The invention as claimed in claim 1, in which the effective pressure surface of the pressure pockets is larger than the effective pressure surface of the pressure-medium holes.

3. The invention as claimed in claim 1, in which the pressure pockets of one guide surface of the rotary component part are arranged congruently opposite to those of the other guide surface of the rotary component part, and the pressure-medium holes of one guide surface of the bearing housing are staggered opposite to those of the other guide surface of the bearing housing.

4. The invention as claimed in claim 3, in which the pressure-medium holes of one guide surface are staggered relative to those of the other other guide surface of the bearing housing on the graduated circle by half the distance between two pressure-medium holes.

5. The invention as claimed in claim 1, in which the pressure-medium holes of one guide surface of the bearing housing are arranged congruently opposite to those of the other guide surface of the bearing housing, and the pressure pockets of one guide surface of the rotary component part are staggered opposite to those of the other guide surface of the rotary component part.

6. The invention as claimed in claim 5, in which the pressure pockets of one guide surface are staggered relative to those of the other guide surface of the rotary component part on the graduated circle by half the distance between two pressure pockets.

7. A sliding bearing, lubricated by a pressure-medium, to provide support for rotary component parts between at least two opposed guide surfaces, comprising a bearing housing supporting a rotary component part, at least one pressure pocket arranged in each guide surface of the rotary component part, and pressure-medium holes in guide surfaces of the bearing housing through which the pressure pocket is supplied with a pressure medium to enable support of the rotary component part, said pressure-medium holes being disposed to radially face each other in the guide surfaces defined by a cylindrical wall of a bearing hole and at least one pressure pocket being disposed independently of any other pressure pocket in the lateral area of a cylindrical component part rotatably disposed in the bearing hole.

8. The invention as claimed in claim 7 in which the effective pressure surface of the pressure pockets is larger than the effective pressure surface of the pressure-medium holes.

9. The invention as claimed in claim 7, in which the pressure pockets of one guide surface of the rotary component part are arranged congruently opposite to those of the other guide surface of the rotary component part, and the pressure-medium holes of one guide surface of the bearing housing are staggered opposite to those of the other guide surface of the bearing housing.

10. The invention as claimed in claim 9, in which the pressure-medium holes of one guide surface are staggered relative to those of the other other guide surface of the bearing housing on the graduated circle by half the distance between two pressure-medium holes.

11. A sliding bearing, lubricated by a pressure-medium, to provide support for rotary component parts between at least two opposed guide surfaces, comprising a bearing housing supporting a rotary component part, at least one pressure pocket arranged in each guide surface of the rotary component part, and pressure-medium holes in guide surfaces of the bearing housing through which the pressure pocket is supplied with a pressure medium to enable support of the rotary component part, said pressure pockets of one guide surface of the rotary component part being arranged congruently opposite to those of the other guide surface of the rotary component part, and the pressure-medium holes of one guide surface of the bearing housing being staggered opposite to those of the other guide surface of the bearing housing.

12. The invention as claimed in claim 11, in which the pressure-medium holes of one guide surface are staggered relative to those of the other guide surface of the bearing housing on the graduated circle by half the distance between two pressure-medium holes.

13. A sliding bearing, lubricated by a pressure-medium, to provide support for rotary component parts between at least two opposed guide surfaces, comprising a bearing housing supporting a rotary component part, at least one pressure pocket arranged in each guide surface of the rotary component part, and pressure-medium holes in guide surfaces of the bearing housing through which the pressure pocket is supplied with a pressure medium to enable support of the rotary component part, said pressure-medium holes of one guide surface of the bearing housing being arranged congruently opposite to those of the other guide surface of the bearing housing, and the pressure pockets of one guide surface of the rotary component part being staggered opposite to those of the other guide surface of the rotary component part.

14. The invention as claimed in claim 13, in which the pressure pockets of one guide surface are staggered relative to those of the other guide surface of the rotary component part on the graduated circle by half the distance between two pressure pockets.

15. A sliding bearing, lubricated by a pressure-medium, to provide support for rotary component parts between at least two opposed guide surfaces, comprising a bearing housing supporting a rotary component part, at least one pressure pocket arranged in each guide surface of the rotary component part, and pressure-medium holes in guide surfaces of the bearing housing through which the pressure pocket is supplied with a pressure medium to enable support of the rotary component part, the effective pressure surface of the pressure pockets being larger than the effective pressure surface of the pressure-medium holes and the pressure-medium holes of one guide surface of the bearing housing being arranged congruently opposite to those of the other guide surface of the bearing housing, and the pressure pockets of one guide surface of the rotary component part being staggered opposite to those of the other guide surface of the rotary component part.

16. The invention as claimed in claim 15, in which the pressure pockets of one guide surface are staggered relative to those of the other guide surface of the rotary component part on the graduated circle by half the distance between two pressure pockets.

* * * * *